(12) United States Patent
Li et al.

(10) Patent No.: US 11,072,116 B2
(45) Date of Patent: Jul. 27, 2021

(54) SWITCHING DEVICE FOR PRINTING MODE OF 3D PRINTER

(71) Applicant: SHANGHAI FUSION TECH CO., LTD., Shanghai (CN)

(72) Inventors: Jianzhe Li, Shanghai (CN); Hua Feng, Shanghai (CN); Xi Cao, Shanghai (CN); Wangping Long, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 0 days.

(21) Appl. No.: 16/759,305

(22) PCT Filed: Oct. 31, 2017

(86) PCT No.: PCT/CN2017/108490
§ 371 (c)(1),
(2) Date: Apr. 24, 2020

(87) PCT Pub. No.: WO2019/080148
PCT Pub. Date: May 2, 2019

(65) Prior Publication Data
US 2020/0298483 A1    Sep. 24, 2020

(30) Foreign Application Priority Data
Oct. 24, 2017    (CN) .................... 201711003497.2

(51) Int. Cl.
*B29C 64/227*    (2017.01)
*B29C 64/245*    (2017.01)
*B33Y 30/00*    (2015.01)

(52) U.S. Cl.
CPC .......... *B29C 64/227* (2017.08); *B29C 64/245* (2017.08); *B33Y 30/00* (2014.12)

(58) Field of Classification Search
CPC ... B29C 64/106; B29C 64/209; B29C 64/227; B29C 64/00; B29C 64/118; B29C 64/20; B29C 64/205
See application file for complete search history.

(56) References Cited

U.S. PATENT DOCUMENTS

2016/0176108 A1    6/2016    Tadin et al.

FOREIGN PATENT DOCUMENTS

| CN | 101445007 A | 6/2009 |
|---|---|---|
| CN | 104162989 A | 11/2014 |
| CN | 105128341 A | 12/2015 |
| CN | 205097550 U | 3/2016 |
| CN | 105751520 A | 7/2016 |
| CN | 105881911 A | 8/2016 |
| CN | 206394025 U | 8/2017 |

*Primary Examiner* — Joseph S Del Sole
*Assistant Examiner* — Mohamed K Ahmed Ali
(74) *Attorney, Agent, or Firm* — Avant Law Group, LLC

(57) ABSTRACT

Switching devices for a printing mode of a 3D printer are disclosed. In some embodiments, the switching devices includes: a component platform with at least two platform bodies (200); at least two handpiece guiding parts (110); at least two platform guiding parts (210); at least two handpiece transmission mechanisms (120); a handpiece drive mechanism configured to drive the handpiece transmission mechanisms (120) to move synchronously; at least two platform transmission mechanisms (220); and a platform drive mechanism configured to drive the platform transmission mechanisms (220) to move synchronously.

7 Claims, 7 Drawing Sheets

SWITCHING DEVICE FOR PRINTING MODE OF 3D PRINTER

CROSS REFERENCE TO RELATED APPLICATIONS

This application is the United State national stage entry under 37 U.S.C. 371 of PCT/CN2017/108490 filed on Oct. 31, 2017, which claims priority to Chinese application number 201711003497.2 filed on Oct. 24, 2017, the disclosure of which are incorporated by reference herein in their entireties.

FIELD OF THE DISCLOSURE

The disclosure relates generally to 3D printing. More specifically, the disclosure relates to a switching device for a printing mode of a 3D printer.

BACKGROUND

Currently, 3D printing develops toward directions of large sizes and high speeds. However, a larger printing size means a larger machine to space ratio. How to improve the printing efficiency per unit area has become a research and development key point of the 3D printing technologies in recent years.

A conventional fused deposition curing printer adopts a triaxial moving manner to accumulate materials to finish printing, and a type of multi-handpiece printer usually constructs an object by means of synchronous handpiece movement or independent monoaxial and coaxial movement.

Synchronous handpiece movement means that two handpieces are disposed in parallel with a fixed interval. The synchronous handpiece movement has an advantage of cooperative printing of multiple materials and can perform simultaneous copy printing in a small range. A disadvantage, however, is that when the copy printing is performed, a larger interval between handpieces indicates a larger printed object, and therefore, the unadjustable interval between the handpieces limits a size of the printed object. For example, if an existing 3D printer is adopted, when a total structure area is 305 mm×305 mm and an interval between nozzles of two handpieces is 24 mm, then only two objects with a section area of 24 mm×305 mm can be simultaneously printed. In other words, the utilization rate is very limited.

The independent monoaxial and coaxial movement means that a plurality of handpieces is installed on a horizontal shaft disposed along the horizontal direction. The plurality of handpieces can separately move along the horizontal shaft, and therefore, interval between the plurality of handpieces can be adjusted. Because the handpieces can move independently, the utilization rate of printing space is relatively high, and copy or mirror printing can be performed at the same time. For example, when two handpieces print simultaneously, an area for printing of a single handpiece is ½ of an area for printing of an entire structure. A disadvantage, however, is that the cost of two or more sets of transmission systems is high, and extremely high consistency cannot be ensured. One of the reasons is that movement of two handpieces along the horizontal shaft is controlled by different transmission structures.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a switching device for a printing mode of a 3D printer. The switching device includes a component platform comprising at least two platform bodies (200); at least two handpiece bodies (100); at least two handpiece guiding parts (110); at least two platform guiding parts (210); at least two handpiece transmission mechanisms (120); a handpiece drive mechanism configured to drive the handpiece transmission mechanisms (120) to move synchronously; at least two platform transmission mechanisms (220); a platform drive mechanism configured to drive the platform transmission mechanisms (220) to move synchronously. Each handpiece guiding part (110) is provided with at least one said handpiece body (100) such that the respective said handpiece body (100) is configured to move along a length direction of the handpiece guiding part (110). Each platform guiding part (210) is provided with at least one said platform body (200) such that the respective said platform body (200) is configured to move along a length direction of the platform guiding part (210). Each handpiece guiding part (110) where each handpiece body (100) that discharges material is located in corresponds to the platform guiding part (210) where the platform body (200) for curing the materials is located in. The length direction of the handpiece guiding part (110) and the length direction of the corresponding platform guiding part (210) are disposed in a staggering manner. The handpiece transmission mechanisms (120) and the handpiece guiding parts (110) are in one-to-one correspondence. Each handpiece transmission mechanism (120) is connected to the handpiece body (100) installed on the corresponding handpiece guiding part (110) through a respective handpiece clutch mechanism (130). The platform transmission mechanisms (220) and the platform guiding parts (210) are in one-to-one correspondence. Each platform transmission mechanism (220) is connected to the platform body (200) installed on the corresponding platform guiding part (210) through a respective platform clutch mechanism (230).

Optionally, at least one end of each handpiece guiding part (110) is provided with a handpiece parking portion (101). The handpiece body (100) on each handpiece parking portion (101) is separated from the handpiece transmission mechanism (120).

Optionally, the length direction of the handpiece guiding part (110) is higher or lower than the length direction of the corresponding platform guiding part (210).

Optionally, all the handpiece guiding parts (110) are disposed in parallel to one another. All the platform guiding parts (210) are disposed in parallel to one another.

Optionally, two adjacent said handpiece guiding parts (110) form a handpiece guiding unit. The handpiece transmission mechanisms (120) corresponding to the two handpiece guiding parts (110) in each handpiece guiding unit drive the installed handpiece bodies (100) to move toward different directions. The platform bodies (200) are detachably connected when a number of the platform guiding part (210) corresponding to the two handpiece guiding parts (110) in each handpiece guiding unit is larger than or equal to two.

Optionally, the handpiece transmission mechanism (120) is a conveying belt. The two handpiece guiding parts (110) in each handpiece guiding unit are connected to form a rotary belt structure. Two ends of the rotary belt structure are respectively provided with a belt wheel (102). The handpiece drive mechanism drives the belt wheel (102) to rotate.

Optionally, the platform clutch mechanism (130) and the platform clutch mechanism (230) are in the same structure and each comprise a clutch driving part (310) and a sliding block (321) provided with a clutch driven part (320). The clutch driving part (310) and the clutch driven part (320) are in a clutch connection. The sliding block (321) in the handpiece clutch mechanism (130) is installed on the handpiece guiding part (110). The clutch driving part (310) in the handpiece clutch mechanism (130) is installed on the handpiece transmission mechanism (120). The sliding block (321) in the platform clutch mechanism (230) is installed on the platform guiding part (210). The clutch driving part (310) in the handpiece clutch mechanism (130) is installed on the platform transmission mechanism (220).

BRIEF DESCRIPTION OF THE DRAWINGS

Illustrative embodiments of the present disclosure are described in detail below with reference to the figures.

DETAILED DESCRIPTION

Figure 1:
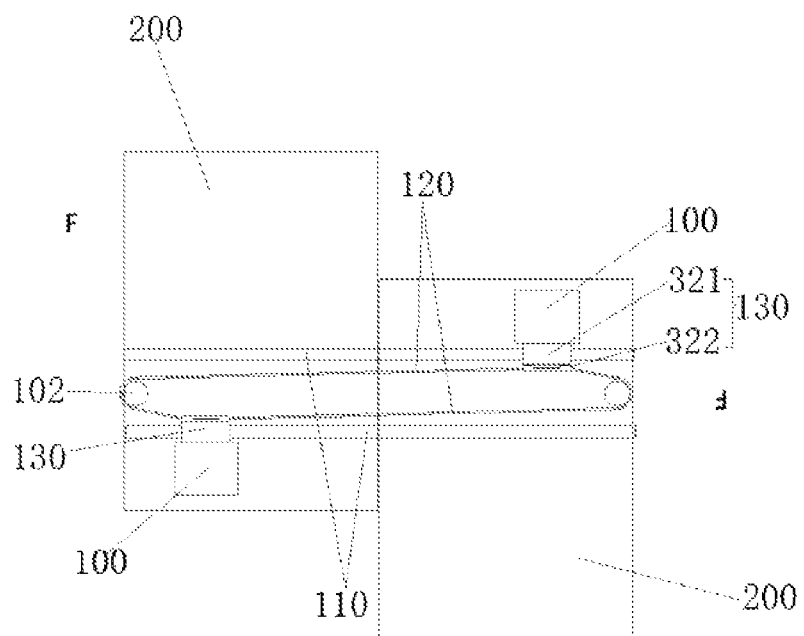
FIG. 1 is a top view of a switching device for a printing mode of a 3D printer in copy printing according to an embodiment of the disclosure.

The following describes some non-limiting embodiments of the invention with reference to the accompanying drawings. The described embodiments are merely a part rather than all the embodiments of the invention. All other embodiments obtained by a person of ordinary skill in the art based on the embodiments of the disclosure shall fall within the scope of the disclosure.

It should be learned by referring to the drawings that the structures, proportions and sizes drawn in the drawings of the present specification are all merely intended to cooperate with the content disclosed in the specification for understanding and reading by a person skilled in the art rather than limiting implementable conditions of the disclosure, and therefore do not possess any technologically substantial meaning. Any structural modification or change of proportional relations or adjustment of sizes shall still fall within a scope that the technical content disclosed in the disclosure may cover without affecting the effects and purposes achieved by the disclosure. Meanwhile, the terms "upper", "lower", "left", "right", "middle", and "one", et cetera, referred in the present specification are also intended for clear description instead of limiting an implementable scope of the disclosure, and the change or adjustment of relative relations shall fall within the implementable scope of the disclosure without substantially changing the technical content. In FIGS. 1-14, 100 represents a handpiece body, 110 represents a handpiece guiding part, 120 represents a handpiece transmission mechanism, 130 represents a handpiece clutch mechanism, 101 represents a handpiece parking portion, 102 represents a belt wheel, 200 represents a platform body, 201 represents a connecting piece, 210 represents a platform guiding part, 220 represents a platform transmission mechanism, 230 represents a platform clutch mechanism, 310 represents a clutch driving part, 311 represents a clamping piece, 320 represents a clutch driven part, 321 represents a sliding block, 11 represents a printing working area, and 12 represents a printing non-working area.

Embodiment 1

As shown in FIG. 1 to FIG. 9, for a switching device for a printing mode of a 3D printer in accordance with the disclosure, the 3D printer may include a component platform and at least two handpiece bodies 100. The component platform may include at least two platform bodies 200. The switching device for a printing mode may include at least two handpiece guiding parts 110, at least two platform guiding parts 210, at least two handpiece transmission mechanisms 120, a handpiece drive mechanism configured to drive the handpiece transmission mechanism 120 to move synchronously, at least two platform transmission mechanisms 220, and a platform drive mechanism configured to drive the platform transmission mechanisms 220 to move synchronously.

Each handpiece guiding part 110 may be provided with at least one handpiece body 100, and the handpiece body 100 may be configured to move along a length direction of the handpiece guiding part 110.

Each platform guiding part 210 may be provided with at least one platform body 200, and the platform body 200 may be configured to move along a length direction of the platform guiding part 210.

Each handpiece body 100 that discharges materials may be located in corresponds to the platform guiding part 210 where the platform body 200 for curing the materials may be located in, and the length direction of the handpiece guiding parts 110 and the length direction of the corresponding platform guiding parts 210 may be disposed in a staggering manner.

The handpiece transmission mechanism 120 and the handpiece guiding part 110 may be in one-to-one correspondence, and the handpiece transmission mechanism 120 may be connected to the handpiece body 100 installed on the corresponding handpiece guiding part 110 through handpiece clutch mechanism 130.

The handpiece drive mechanism may drive each handpiece transmission mechanism 120 to move, and each handpiece transmission mechanism 120 may drive all the handpiece bodies 100 on the corresponding handpiece guiding part 110 to move toward any end of the platform guiding part 210.

The platform transmission mechanism 220 and the platform guiding part 210 may be in one-to-one correspondence, and the platform transmission mechanism 220 may be connected to the platform body 200 installed on the corresponding platform guiding part 210 through platform clutch mechanism 230.

The platform drive mechanism may drive each platform transmission mechanism 220 to move, and each platform transmission mechanism 220 may drive all the platform bodies 200 on the corresponding platform guiding part 210 to move toward any end of the platform guiding part 210.

The handpiece transmission mechanism 120 and the handpiece guiding part 110 may be in one-to-one correspondence, and the platform transmission mechanism 220 and the platform guiding part 210 may be in one-to-one correspondence. Therefore, the handpiece drive mechanism may drive each handpiece transmission mechanism 120 to move, so that each handpiece transmission mechanism 120 may drive all the handpiece bodies 100 on the corresponding handpiece guiding part 110 to move toward any end of the platform guiding part 210. The platform drive mechanism may drive each platform transmission mechanism 220, so that each platform transmission mechanism 220 may drive all the platform bodies 200 on the corresponding platform guiding part 210 to move toward any end of the platform guiding part 210. The switching device for a printing mode may implement copy printing and/or mirror printing.

Because the handpiece drive mechanism may drive all the handpiece transmission mechanisms 120 to move synchronously and the platform drive mechanism may drive all the platform transmission mechanisms 220 to move synchronously, extremely high consistency may be ensured by adopting such structure of the device for 3D printing.

The handpiece transmission mechanism 120 and the handpiece body 100 may be connected through the handpiece clutch mechanism 130. Therefore, when being kept connected to one handpiece body 100, the handpiece transmission mechanism 120 may be kept separated from the remaining handpiece bodies 100, thus implementing independent printing of one handpiece body 100.

In order to facilitate compiling of a printing program and to control a 3D printing process, the length direction of the handpiece guiding part 110 may be vertical to the length direction of the corresponding platform guiding part 210.

In order to drive the handpiece body 100 and the platform body 200 to move stably, all the handpiece guiding parts 110 may be disposed in parallel, and all the platform guiding parts 210 may be disposed in parallel.

Two adjacent handpiece guiding parts 110 may form a handpiece guiding unit, and the handpiece transmission mechanism 120 corresponding to the two handpiece guiding parts 110 in each handpiece guiding unit may drive the mounted handpiece body 100 to move toward different directions. When a number of the platform guiding parts 210 corresponding to the two handpiece guiding parts 110 in each handpiece guiding unit is larger than or equal to two, the platform bodies 200 may be detachably connected with each other. Because of the existence of the structure, the entire device may be more compact in structure, and may facilitate mirror printing. When the mirror printing is required, two adjacent platform bodies 200 may be connected through a connecting piece 201.

The handpiece transmission mechanism 120 may be a conveying belt, the two handpiece guiding parts 110 in each handpiece guiding unit may be connected to form a rotary belt structure, two ends of the rotary belt structure may be respectively provided with belt wheel 102, and the handpiece drive mechanism may drive the belt wheel 120 to rotate. The handpiece drive mechanism may drive the belt wheel 120 to rotate, so that the belt wheel 102 may drive the two conveying belts to move simultaneously, thereby improving the moving synchronism. The handpiece drive mechanism may be a motor, et cetera. The platform transmission mechanisms 220 and the handpiece transmission mechanism 120 may be the same in structure.

At least one end of the handpiece guiding part 110 may be provided with a handpiece parking portion 101, and the handpiece body 100 on the handpiece parking portion 101 may be separated from the handpiece transmission mechanism 120. Because of the structure, the handpiece body 100 separated from the handpiece transmission mechanism 120 may be in the handpiece parking portion 101, and the handpiece body 100 separated from the handpiece transmission mechanism 120 may be prevented from affecting the handpiece body 100 which performs independent printing. Here, the distance that any handpiece body 100 may move on an entire constructed platform along the length direction of the handpiece guiding part 110 may be the length of a printing working area 11. The platform body 200 may move along the length direction of the platform guiding part 210 and pass by a maximal distance which may be the width of the printing working area 11. The exterior of the printing working area 11 may be a printing non-working area 12. The handpiece parking portion 101 may be in the printing non-working area 12.

The platform clutch mechanism 130 and the platform clutch mechanism 230 may be the same in structure, and each may include a clutch driving part 310 and a sliding block 321 provided with a clutch driven part 320. The clutch driving part 310 and the clutch driven part 320 may be in a clutch connection. The sliding block 321 in the handpiece clutch mechanism 130 may be installed on the handpiece guiding part 110, and the clutch driving part 310 in the handpiece clutch mechanism 130 may be installed on the handpiece transmission mechanism 120. The sliding block 321 in the platform clutch mechanism 230 may be installed on the platform guiding part 210, and the clutch driving part 310 in the handpiece clutch mechanism 130 may be installed on the platform transmission mechanism 220. The clutch driving part 310 may be installed on a clamping piece 311. In the handpiece clutch mechanism 130, the clutch driving part 310 may be installed on the handpiece transmission mechanism 120 by the clamping piece 311, and in the platform clutch mechanism 230, the clutch driving part 310 may be installed on the platform transmission mechanism 220 by the clamping piece 311.

Here, the clutch driving part 310 may be an electromagnet, and the clutch driven part 320 may be an iron sheet. After being powered on, the electromagnet adsorbs the iron sheet, and then the clutch driving part 310 may be connected to the clutch driven part 320. After being powered off, an adsorption force of the electromagnet for the iron sheet disappears, and then the clutch driving part 310 may be separated from the clutch driven part 320.

Here, a number of the handpiece guiding part 110, the platform guiding part 210, the handpiece transmission mechanism 120, the platform transmission mechanism 220, the handpiece body 100 and the platform body 200, and the handpiece clutch mechanism 130 and the platform clutch mechanism 230 may be two, respectively.

Each handpiece guiding part 110 and each platform guiding part 210 may be a structure of two cylindrical rod pieces. The two handpiece guiding parts 110 may be an integral structure, such as a two-sided guide rail, et cetera.

Figure 2:
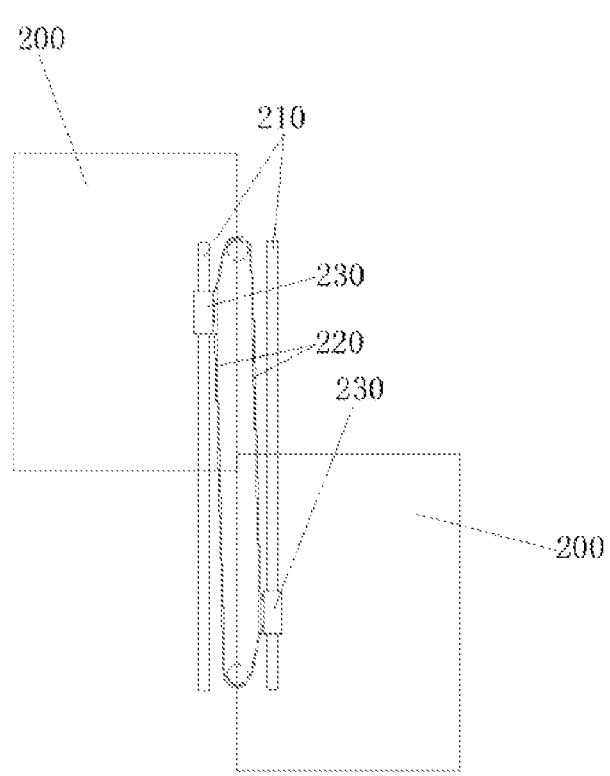
FIG. 2 is a bottom view of a switching device for a printing mode of a 3D printer in copy printing according to an embodiment of the disclosure.

As shown in FIGS. 1-2, when in copy printing, the two handpiece transmission mechanisms 120 may be respectively connected to one handpiece body 100. The two platform transmission mechanisms 220 may be respectively connected to one platform body 200. The two handpiece bodies 100 may be different in moving direction, and the two platform bodies 200 may be different in moving direction. Materials discharged by the two handpiece bodies 100 may be respectively cured on different platform bodies 200. Letters F on left and right sides outside the entire constructed platform in FIG. 1 show the form of the cured letter F after copy printing on the platform body 200.

Figure 3:
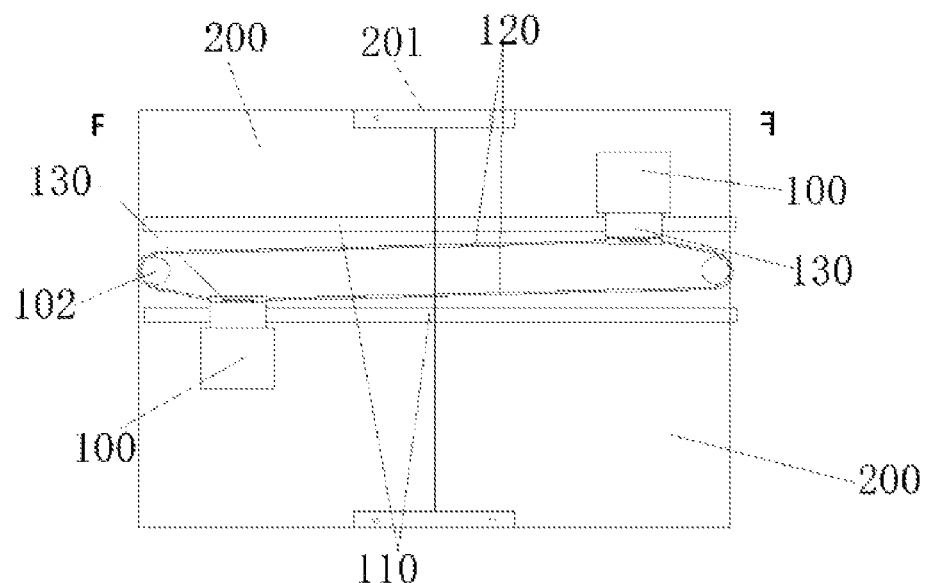
FIG. 3 is a top view of a switching device for a printing mode of a 3D printer in mirror printing according to an embodiment of the disclosure.
Figure 4:
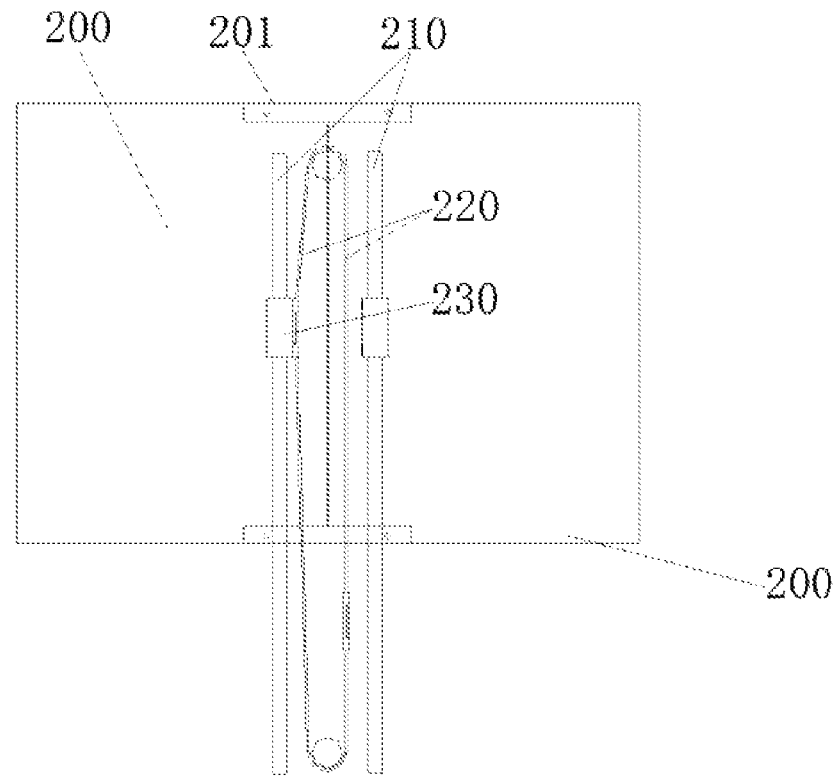
FIG. 4 is a bottom view of a switching device for a printing mode of a 3D printer in mirror printing according to an embodiment of the disclosure.

As shown in FIG. 3 to FIG. 4, when in mirror printing, the two handpiece transmission mechanisms 120 may be respectively connected to one handpiece body 100. One of the two platform transmission mechanisms 220 may be connected to one platform body 200, and the other of the two platform transmission mechanisms 220 may be separated from the other platform body 200. The two platform bodies 200 may be connected. The two platform bodies 200 may be in the same moving direction, and the two handpiece bodies 100 may be in different moving directions. The materials discharged by the two handpiece bodies 100 may be respectively cured on different platform bodies 200. Letters F on left and right sides outside the entire constructed platform in FIG. 3 show the form of the cured letter F after mirror surface printing on the platform body 200.

Figure 5:
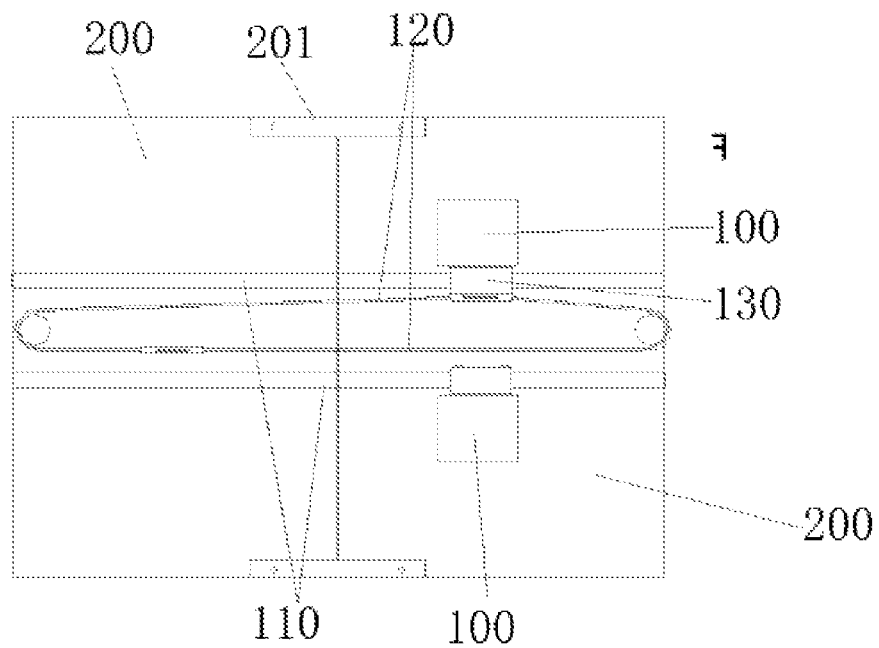
FIG. 5 is a bottom view of a switching device for a printing mode of a 3D printer in independent printing according to an embodiment of the disclosure.
Figure 6:
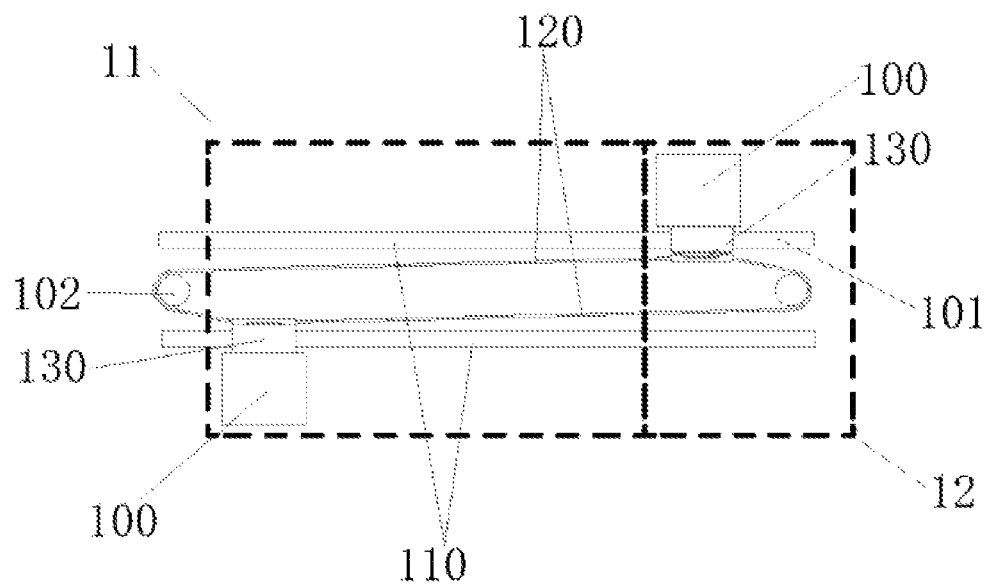
FIG. 6 illustrates one of the handpiece bodies moving to a handpiece parking portion of a switching device for a printing mode of a 3D printer in independent printing according to an embodiment of the disclosure.
Figure 7:
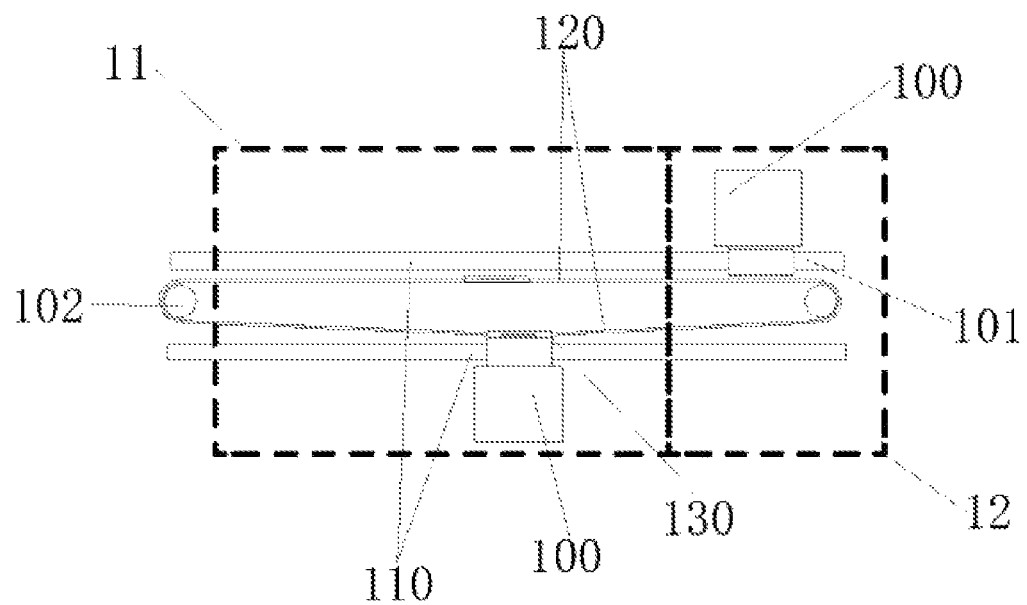
FIG. 7 illustrates one of the handpiece bodies moving to a handpiece parking portion and being separated from a handpiece transmission mechanism of a switching device for a printing mode of a 3D printer in independent printing according to an embodiment of the disclosure.
Figure 8:
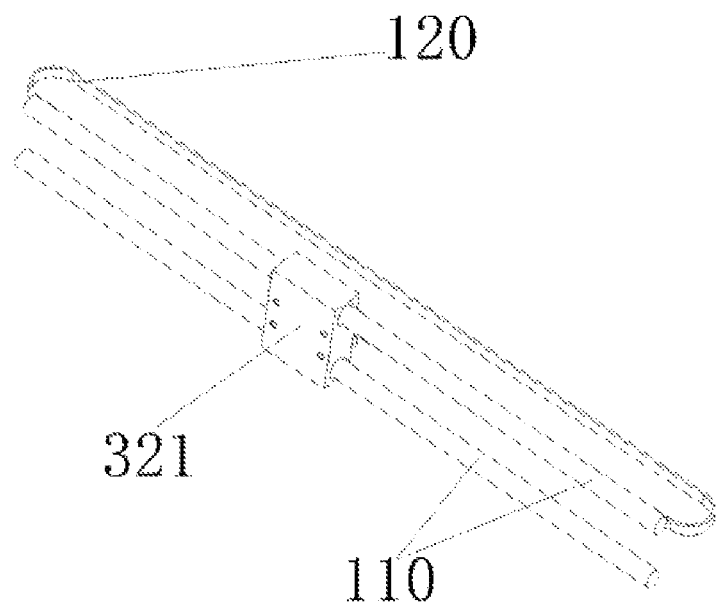
FIG. 8 illustrates a sliding block in a clutch mechanism installed on a handpiece guiding part in the switching device for a printing mode of a 3D printer according to an embodiment of the disclosure.
Figure 9:
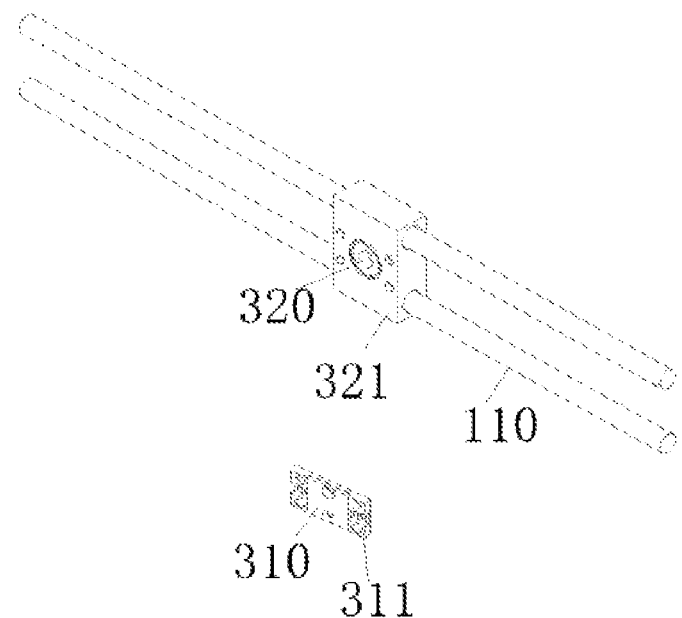
FIG. 9 illustrates a clutch diving part and a clutch driven part of a clutch mechanism separated in the switching device for a printing mode of a 3D printer according to an embodiment of the disclosure.

As shown in FIG. 4 to FIG. 5, when in independent printing, one of the two handpiece transmission mechanisms 120 may be connected to one handpiece body 100, and the other of the two handpiece transmission mechanisms 120 may be separated from the other handpiece body 100. One of the two platform transmission mechanisms 220 may be connected to one platform body 200, and the other of the two platform transmission mechanisms 220 may be separated from the other platform body 200. The two platform bodies 200 may be connected. The two platform bodies 200 may be in the same moving direction, and the handpiece transmission mechanism 120 may drive one handpiece body 100 to move. Letter F on the right side outside the entire constructed platform in FIG. 5 show the form of the cured letter F after independent printing on the platform body 200.

Embodiment 2

Figure 10:
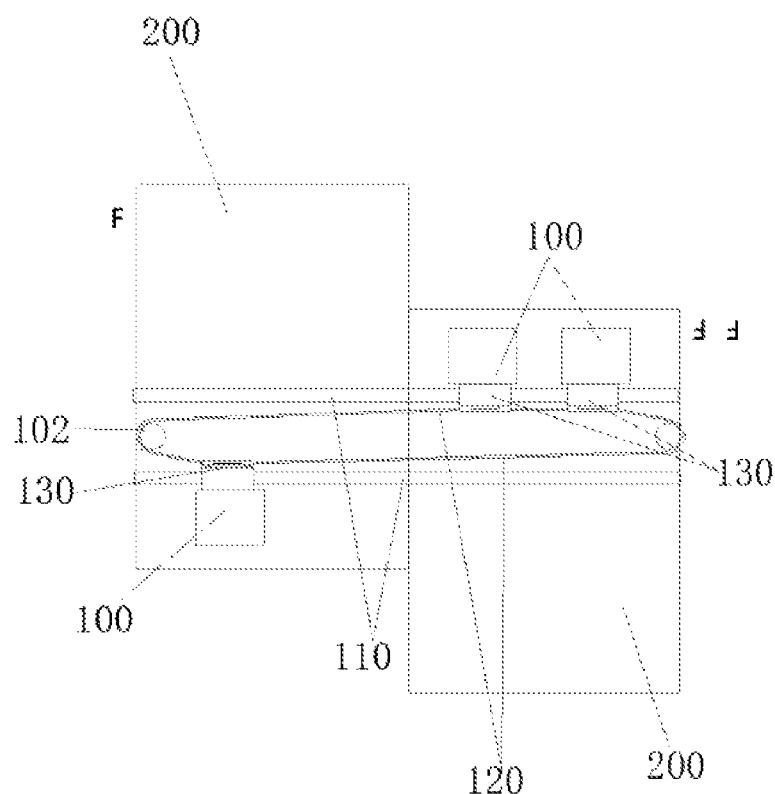
FIG. 10 is a top view of a switching device for a printing mode of a 3D printer in copy printing according to an embodiment of the disclosure.
Figure 11:
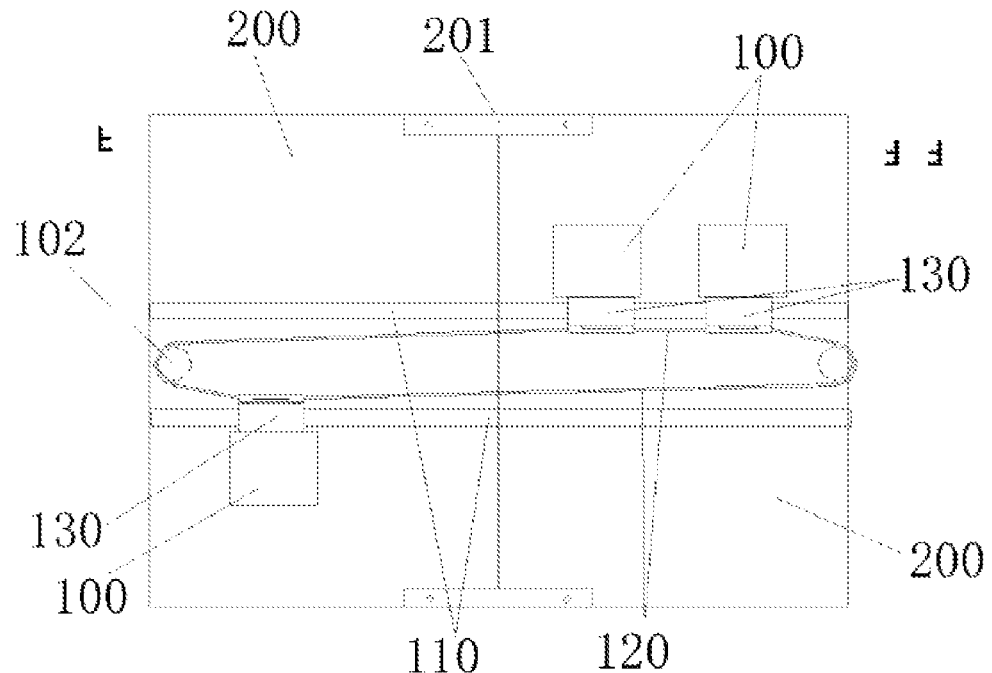
FIG. 11 is a top view of a switching device for a printing mode of a 3D printer in mirror printing according to an embodiment of the disclosure.

As shown in FIGS. 10-11, this embodiment differs from the embodiment 1 in that the number of the handpiece body 100 may be three. Two of the three handpiece bodies 100 may be installed on a same handpiece guiding part 110.

As shown in FIG. 10, when in copy printing, one of the two handpiece transmission mechanisms 120 may be connected to one handpiece body 100, and the other one of the two handpiece transmission mechanisms 120 may be connected to the two handpiece bodies 100. The two handpiece bodies 100 on a same handpiece transmission mechanism 120 and the handpiece body 100 independently disposed on the handpiece transmission mechanism 120 may move in different directions, and the two platform bodies 200 may move in different directions. The materials discharged by the two handpiece bodies 100 on a same handpiece guiding part 110 may be cured on one platform body 200, and the material discharged by the one handpiece body 100 on the other handpiece guiding part 110 may be cured on the other platform body 200. In FIG. 10, three letters F on left and right sides outside the entire constructed platform may show the form of the cured letter F after copy printing on the platform body 200 close to the three letters F.

As shown in FIGS. 4 and 11, when in mirror printing, one of the two handpiece transmission mechanisms 120 may be connected to one handpiece body 100, and the other of the two handpiece transmission mechanisms 120 may be connected to the two handpiece bodies 100. One of the two platform transmission mechanisms 220 may be connected to one platform body 200, and the other of the two platform transmission mechanisms 220 may be separated from the other platform body 200. The two platform bodies 200 may be connected. The materials discharged by the two handpiece bodies 100 on a same handpiece guiding part 110 may be cured on one platform body 200, and the material discharged by the one handpiece body 100 on the other handpiece guiding part 110 may be cured on the other platform body 200. In FIG. 11, three letters F on left and right sides outside the entire constructed platform may show the form of the cured letter F after mirror printing on the platform body 200 close to the three letters F.

Embodiment 3

Figure 12:
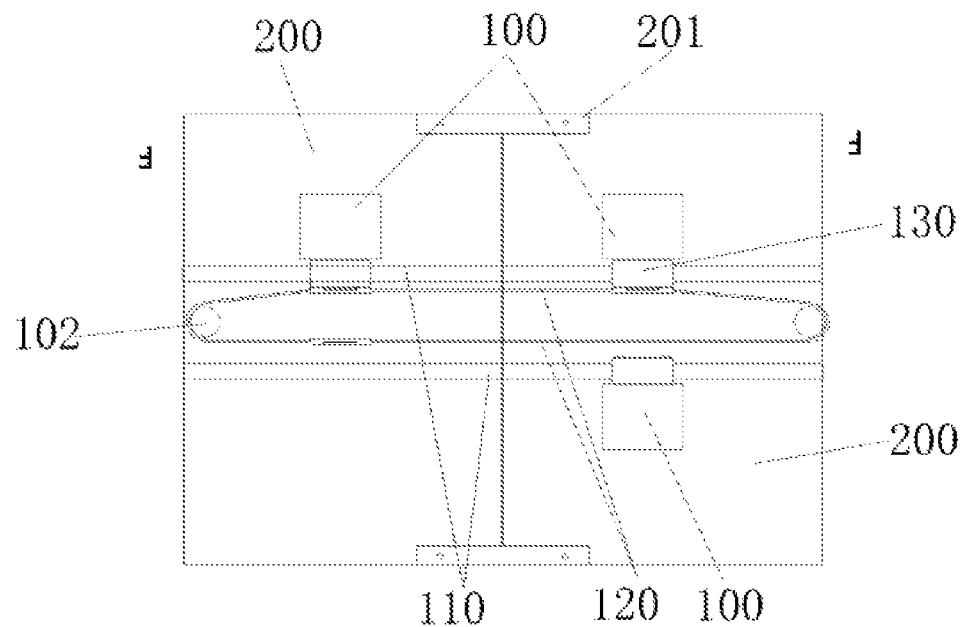
FIG. 12 is a top view of a switching device for a printing mode of a 3D printer in copy printing according to an embodiment of the disclosure.

As shown in FIG. 12, this embodiment differs from the embodiment 2 in that when in copy printing, in the three handpiece bodies 100, the materials discharged by the two handpiece bodies 100 on a same handpiece guiding part 110 may be respectively cured on different platform bodies 200. In the three handpiece bodies 100, the remaining handpiece body 100 may be separated from the handpiece transmission mechanism 120. In FIG. 12, two letters F on left and right sides outside the entire constructed platform may show the form of the cured letter F after copy printing on the platform body 200 close to the two letters F.

Embodiment 4

Figure 13:
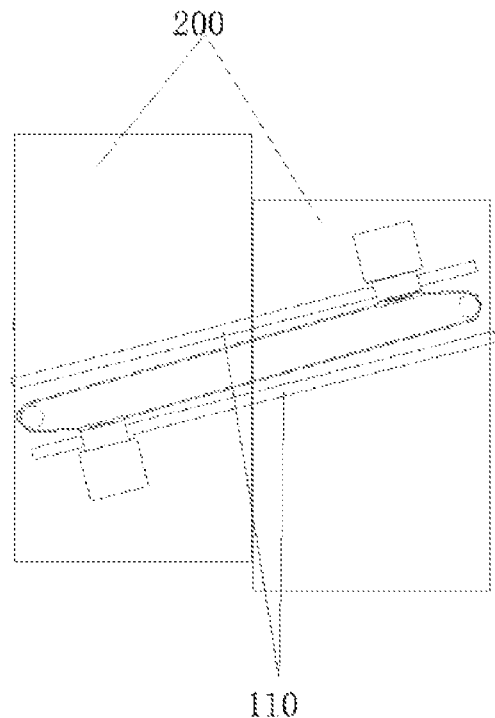
FIG. 13 is a top view of a switching device for a printing mode of a 3D printer according to an embodiment of the disclosure.
Figure 14:
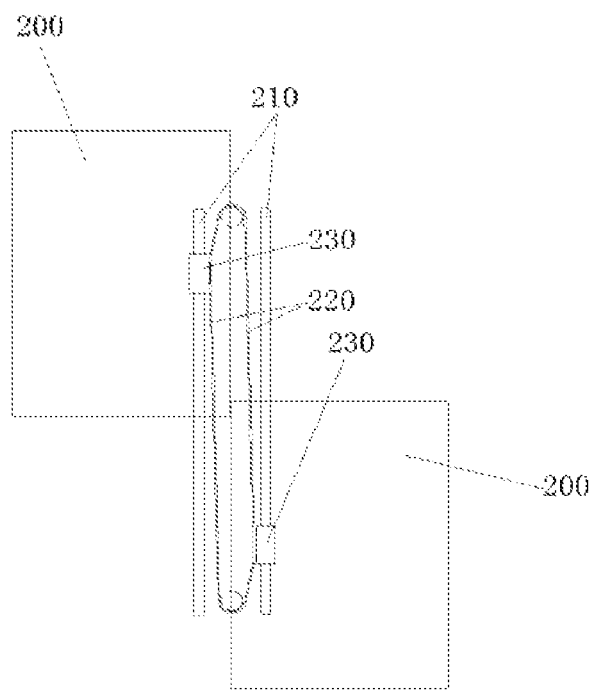
FIG. 14 is a bottom view of a switching device for a printing mode of a 3D printer according to an embodiment of the disclosure.

As shown in FIGS. 13-14, this embodiment differs from the embodiment 1 in that an included angle between the length direction of the handpiece guiding part 110 and the length direction of the corresponding platform guiding part 210 may be 45 degrees.

The switching device for a printing mode consistent with the disclosure may be simple in structure, convenient to use, capable of implementing copy printing, mirror printing and independent printing. The switching device may be capable of adjusting a printing area according to requirements.

The foregoing embodiments only illustratively explain the principles and effects of the disclosure instead of limiting the disclosure. Any person skilled in the art may modify or change the foregoing embodiments without departing from the spirit and scope of the disclosure. Therefore, all equivalent modifications or changes finished by those with ordinary sill in the art without departing from the spirit and technical thoughts disclosed by the disclosure shall still be covered by claims of the disclosure.

Various embodiments of the disclosure may have one or more of the following effects.

In some embodiments, the disclosure may provide a switching device for a printing mode of a 3D printer which may help to solve problems in the prior art. The switching device may implement copy printing, mirror printing, and independent printing.

In other embodiments, the disclosure may provide a switching device for a printing mode of a 3D printer where the handpiece transmission mechanism and the handpiece guiding part may be in one-to-one correspondence and the platform transmission mechanism and the platform guiding part may be in one-to-one correspondence. As a result, the handpiece drive mechanism may drive each handpiece transmission mechanism to move, so that each handpiece transmission mechanism may drive all the handpiece bodies on the corresponding handpiece guiding part to move toward any end of the platform guiding part. The platform drive mechanism may drive each platform transmission mechanism, so that each platform transmission mechanism may drive all the platform bodies on the corresponding platform guiding part to move toward any end of the platform guiding part. Therefore, the switching device for a printing mode may implement copy printing and/or mirror printing.

In further embodiments, the disclosure may provide a switching device for a printing mode of a 3D printer where the handpiece drive mechanism may drive all the handpiece transmission mechanisms to move synchronously, and the platform drive mechanism may drive all the platform transmission mechanisms to move synchronously. As a result, extremely high consistency may be ensured by adopting such structure of the device for 3D printing.

In some embodiments, the disclosure may provide a switching device for a printing mode of a 3D printer where the handpiece transmission mechanism and the handpiece body are connected through the handpiece clutch mechanism. Therefore, when being kept connected to one handpiece body, the handpiece transmission mechanism may be kept separated from the remaining handpiece bodies, thus implementing independent printing of one handpiece body.

In other embodiments, the switching device for a printing mode in accordance with the disclosure may be simple in structure, convenient to use, and capable of implementing copy printing, mirror printing, and independent printing. The switching device for a printing mode in accordance with the disclosure may be capable of adjusting a printing area according to requirements.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A switching device for a printing mode of a 3D printer, comprising:
   a component platform comprising at least two platform bodies (200);
   at least two handpiece bodies (100);
   at least two handpiece guiding parts (110), wherein
      each handpiece guiding part (110) is provided with at least one said handpiece body (100) such that the respective said handpiece body (100) is configured to move along a length direction of the handpiece guiding part (110);
   at least two platform guiding parts (210), wherein
      each platform guiding part (210) is provided with at least one said platform body (200) such that the respective said platform body (200) is configured to move along a length direction of the platform guiding part (210),
      each handpiece guiding part (110) where each handpiece body (100) that discharges material is located in corresponds to the platform guiding part (210) where the platform body (200) for curing the materials is located in, and
      the length direction of the handpiece guiding part (110) and the length direction of the corresponding platform guiding part (210) are disposed in a staggering manner;
   at least two handpiece transmission mechanisms (120), wherein
      the handpiece transmission mechanisms (120) and the handpiece guiding parts (110) are in one-to-one correspondence, and
      each handpiece transmission mechanism (120) is connected to the handpiece body (100) installed on the corresponding handpiece guiding part (110) through a respective handpiece clutch mechanism (130);
   a handpiece drive mechanism configured to drive the handpiece transmission mechanisms (120) to move synchronously;
   at least two platform transmission mechanisms (220), wherein
      the platform transmission mechanisms (220) and the platform guiding parts (210) are in one-to-one correspondence, and
      each platform transmission mechanism (220) is connected to the platform body (200) installed on the corresponding platform guiding part (210) through a respective platform clutch mechanism (230); and
   a platform drive mechanism configured to drive the platform transmission mechanisms (220) to move synchronously.

2. The switching device of claim 1, wherein:
   at least one end of each handpiece guiding part (110) is provided with a handpiece parking portion (101); and
   the handpiece body (100) on each handpiece parking portion (101) is separated from the handpiece transmission mechanism (120).

3. The switching device of claim 1, wherein the length direction of the handpiece guiding part (110) is higher or lower than the length direction of the corresponding platform guiding part (210).

4. The switching device of claim 3, wherein:
   all the handpiece guiding parts (110) are disposed in parallel to one another; and all the platform guiding parts (210) are disposed in parallel to one another.

5. The switching device of claim 4, wherein:

two adjacent said handpiece guiding parts (110) form a handpiece guiding unit;

the handpiece transmission mechanisms (120) corresponding to the two handpiece guiding parts (110) in each handpiece guiding unit drive the installed handpiece bodies (100) to move toward different directions; and the platform bodies (200) are detachably connected when a number of the platform guiding part (210) corresponding to the two handpiece guiding parts (110) in each handpiece guiding unit is larger than or equal to two.

6. The switching device of claim 5, wherein:

the handpiece transmission mechanism (120) is a conveying belt;

the two handpiece guiding parts (110) in each handpiece guiding unit are connected to form a rotary belt structure;

two ends of the rotary belt structure are respectively provided with a belt wheel (102); and the handpiece drive mechanism drives the belt wheel (102) to rotate.

7. The switching device of claim 1, wherein:

the platform clutch mechanism (130) and the platform clutch mechanism (230) are in the same structure and each comprise a clutch driving part (310) and a sliding block (321) provided with a clutch driven part (320);

the clutch driving part (310) and the clutch driven part (320) are in a clutch connection;

the sliding block (321) in the handpiece clutch mechanism (130) is installed on the handpiece guiding part (110);

the clutch driving part (310) in the handpiece clutch mechanism (130) is installed on the handpiece transmission mechanism (120);

the sliding block (321) in the platform clutch mechanism (230) is installed on the platform guiding part (210); and the clutch driving part (310) in the handpiece clutch mechanism (130) is installed on the platform transmission mechanism (220).

* * * * *